US011509818B2

(12) United States Patent
Adams et al.

(10) Patent No.: US 11,509,818 B2
(45) Date of Patent: Nov. 22, 2022

(54) INTELLIGENT PHOTOGRAPHY WITH MACHINE LEARNING

(71) Applicant: Disney Enterprises, Inc., Burbank, CA (US)

(72) Inventors: Mathew G. Adams, Winter Garden, FL (US); Jere M. Kirkley, Winter Garden, FL (US); Jason B. Jenkins, Tampa, FL (US)

(73) Assignee: Disney Enterprises, Inc., Burbank, CA (US)

( * ) Notice: Subject to any disclaimer, the term of this patent is extended or adjusted under 35 U.S.C. 154(b) by 262 days.

(21) Appl. No.: 16/743,855

(22) Filed: Jan. 15, 2020

(65) Prior Publication Data

US 2020/0259999 A1 Aug. 13, 2020

Related U.S. Application Data

(60) Provisional application No. 62/804,050, filed on Feb. 11, 2019.

(51) Int. Cl.
*H04N 5/232* (2006.01)

(52) U.S. Cl.
CPC ..... *H04N 5/23222* (2013.01); *H04N 5/23219* (2013.01)

(58) Field of Classification Search
CPC ... H04N 5/23222; H04N 5/23219; G06N 3/08
See application file for complete search history.

(56) References Cited

U.S. PATENT DOCUMENTS

| 2007/0024717 | A1* | 2/2007 | Chatenever | G06F 8/65 |
| | | | | 348/211.99 |
| 2014/0362256 | A1* | 12/2014 | Schulze | H04N 5/23277 |
| | | | | 382/284 |
| 2018/0220061 | A1* | 8/2018 | Wang | H04N 5/2351 |

* cited by examiner

*Primary Examiner* — Ahmed A Berhan
(74) *Attorney, Agent, or Firm* — Patterson + Sheridan, LLP (57) ABSTRACT

Embodiments of the present disclosure relate to intelligent photography with machine learning. Embodiments include receiving a video stream from a control camera. Embodiments include providing inputs to a trained machine learning model based on the video stream. Embodiments include determining, based on data output by the trained machine learning model in response to the inputs, at least a first time for capturing a first picture during a session. Embodiments include programmatically instructing a first camera to capture the first picture at the first time during the session.

20 Claims, 6 Drawing Sheets

INTELLIGENT PHOTOGRAPHY WITH MACHINE LEARNING

CROSS-REFERENCE TO RELATED APPLICATIONS

This application claims benefit of U.S. provisional patent application Ser. No. 62/804,050 filed Feb. 11, 2019 which is herein incorporated by reference in its entirety.

BACKGROUND

Field of the Invention

The present invention generally relates to intelligent photography, and more specifically to techniques for using machine learning to determine indications for programmatically capturing photographs.

Description of the Related Art

Photography generally involves analyzing a scene in order to determine optimal times for taking pictures, as well as identifying other optimal parameters, such as angles, exposures, and the like, for taking the pictures. When photographing live subjects, photographers generally observe the behavior of the subjects in order to determine photo-worthy events and optimal moments for capturing pictures.

In many settings, such as public places, photo-worthy events may occur frequently. For example, at theme parks, landmarks, sporting events, concerts and other public attractions, visitors are often photographed by both human and automated photographers and then provided with pictures of their visit, and may be given opportunities to purchase the pictures. Existing automated techniques, such as automatically capturing pictures at regular intervals for subsequent best-shot selection or post-processing to crop and improve photographs, may be inefficient and unresponsive to real-time circumstances. Furthermore, behavior of subjects may be unpredictable, making it more difficult to use systems based on fixed cues (e.g., regular intervals) for capturing pictures, as it is unlikely that such systems would successfully capture photo-worthy moments. In some situations it may be disruptive or otherwise undesirable for people to be aware that they are being photographed, as it may detract from the experience.

SUMMARY

The present disclosure provides, in one embodiment, a method comprising: receiving a video stream from a control camera; providing inputs to a trained machine learning model based on the video stream; determining, based on data output by the trained machine learning model in response to the inputs, at least a first time for capturing a first picture during a session; and programmatically instructing a first camera to capture the first picture at the first time during the session.

The present disclosure provides, in another embodiment, a computer-readable medium comprising instructions that, when executed by one or more processors, cause the one or more processors to perform a method, the method comprising: receiving a video stream from a control camera; providing inputs to a trained machine learning model based on the video stream; determining, based on data output by the trained machine learning model in response to the inputs, at least a first time for capturing a first picture during a session; and programmatically instructing a first camera to capture the first picture at the first time during the session.

The present disclosure provides, in another embodiment, a system comprising one or more processors and a computer-readable medium comprising instructions that, when executed by the one or more processors, cause the one or more processors to perform a method, the method comprising: receiving a video stream from a control camera; providing inputs to a trained machine learning model based on the video stream; determining, based on data output by the trained machine learning model in response to the inputs, at least a first time for capturing a first picture during a session; and programmatically instructing a first camera to capture the first picture at the first time during the session.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

The present invention generally relates to training machine learning model and using a trained machine learning model to perform intelligent photography. There are many cases in which intelligent photography may be useful, such as at theme parks, landmarks, sporting events, endurance events, conventions, classrooms, concerts, and other attractions where large numbers of people are in attendance and would like to memorialize the experience. Conventionally, photographers may observe the events and behaviors of people such as pose, expression, gaze direction and the like in order to determine optimal or desirable moments and parameters at which to capture pictures. Techniques described herein involve improved techniques for intelligent photography.

In certain embodiments, a model is trained using machine learning techniques to identify photo-worthy moments in a live video stream from one or more control camera(s) present at a scene, as well as parameters for capturing pictures of the photo-worthy moments. A control camera may be a video camera that is placed at a fixed location and provides a continual video stream of a given environment, such as an area in which guests interact with characters at a theme park, and is generally different than one or more cameras used to capture pictures in the environment. Hence, the control camera(s) may provide a visual perspective on the photography activities that is different from the perspective of a photographer and may indeed include multiple perspectives that would be impossible for a photographer to obtain.

The model may, for example, be trained using historical video data captured by control camera(s) during historical sessions associated with historical picture data related to pictures captured by live photographers during the historical sessions. For example, a given training data set may be gathered by running a control camera while subjects are photographed and gathering data about pictures being taken by a live photographer while the control camera is capturing video, such as body positions, facial expressions, and gaze direction of subjects in the pictures as well as information about the capturing of the pictures, such as the times at which the pictures are taken, the angles at which the pictures are taken, and camera settings such as exposure, focus, and the like. As such, a control system may draw correlations between behavior of individuals, such as body positions, facial expressions, gaze direction and the like, in the video from the control camera perspective and moments at which the photographer captured pictures, as well as other parameters of those pictures, such as the angles at which they were taken. These correlations train the model to recognize similar behavior in a live video stream from a control camera and thereby identify moments at which a photographer would have taken a picture, as well as the parameters of that picture.

Training a model according to embodiments of the present disclosure uses a training data set that includes training inputs that are associated with particular training outputs (e.g., labels). As such, training data comprising historical video data (e.g., from control cameras) associated with historical picture data (e.g., times at which pictures were taken by photographers and other parameters of those pictures) is used to train the model to output picture indications (e.g., times and parameters for taking pictures) based on a live video stream from a control camera. Training inputs may comprise particular images from the historical video data, including particular features extracted from the images such as body positions of individuals in the video (i.e., poses), that are associated with certain training outputs, such as data related to a picture that was taken by a photographer at the time of the particular body positions.

In an example, the training process involves identifying features that will be used in training, extracting the identified features from the training data, using the extracted features as inputs of the model, and iteratively adjusting parameters of the model until the model outputs (e.g., picture indications) correspond to training outputs (e.g., indications of when pictures were actually taken in the training data) that correspond to the training inputs.

Once trained, the model may accept a live video stream or, in some embodiments, features extracted from the live video stream through pre-processing (e.g., extracting a face, or determining a pose, or determining the angle between the camera and the face center), as input data and, whenever a photo-worthy moment is identified in the video stream, may output an indication that a picture of the photo-worthy moment should be captured. When such an indication is output by the model, a picture may be programmatically captured based on the output from the model. Outputs from the trained model in response to a live video stream input may, therefore, be used to trigger cameras to take pictures at times and using parameters that similar to that used by photographers.

In one embodiment, a model as described herein may be a multilayer deep neural network, such as a convolutional neural network (CNN). A CNN is a type of deep learning model in which trainable filters and local neighborhood pooling operations are applied alternatively on the raw input data at different layers, resulting in a hierarchy of increasingly complex features. In some embodiments, the CNN may include a first layer with a trainable filter that can learn body positions of individuals in images from training data—e.g., from control video data of the individuals captured in historical sessions—and a second layer that can learn relationships between the individuals' body positions and data about photos that were captured (e.g., by photographers) during the historical sessions from the training data. In some embodiments, a full feedforward neural net can be used to connect convolutions and pooling layers corresponding to different layers. One advantage of CNNs is that they are able to construct powerful non-linear models by leveraging information from a large set of training images. Moreover, once trained, CNNs are able to quickly evaluate input data and do not require manual tuning or parameter tweaking.

Training a model, such as a CNN, may involve training components to learn a hierarchy of features by building high-level features (e.g., body positions) from low-level ones (e.g., images from a video stream), thereby automating the process of feature construction. Furthermore, the model is trained to identify associations between features and data about pictures that were taken, such as data about a picture that was captured by a photographer at the same time that a given set of features were present in an image from a control camera video stream. The model may also be trained to identify associations between features and other events, such as beginnings and endings of sessions (e.g., a session in which an individual guest or group interacts with a character at a theme park). A session generally refers to a span of time where one or more subjects are photographed with a common purpose or theme such as a subject performing an activity, meeting a costumed character, meeting a player at a sporting event, meeting a performer at a concert or the like. Identifying photography sessions is a valuable organizational feature as it enables photographs captured during a session to be stored separately from other sessions or tagged with metadata that identifies the sessions. In this way photographs are readily shared with the subjects in the photographs, or organized by session theme, activity, time or other characteristic that defines a session. For example, the training data may include data indicating these events that were recorded by a photographer in association with video from control cameras, such as associated with particular timestamps in the video data. In certain embodiments, in order to improve processing efficiency, images input into the model from a control video stream (e.g., as a streaming array of pixels) are scaled down from the size, color, dynamic range, and/or resolution at which they are captured. In one example, images from the control video stream are scaled down to 368×368 pixels (e.g., from 1920×1080 pixels) before being processed by the model as training data or as real-time input data. In another example, images may be provided to the model in grayscale. Furthermore, the model may limit processing to one or more region(s) of interest within each image, such as the portion of the image in which the subject(s) of photography are located. For example, the region of interest may be based on the environment in which the video and photographs are taken, such that it is focused only on the subjects, and may be configured in advance or identified programmatically, such as based on detection of subjects present in the images. In some embodiments, segmentation of pixels to identify regions of interest is performed as pre-processing outside of the model.

It is noted that, while certain embodiments involve training the model based on features extracted from video data, alternative embodiments involve training the model based on features extracted from other sources, such as audio data. For example, moments at which pictures were historically taken by photographers may be associated with certain audio features in audio data that was captured at the time the pictures were taken, such as cheers from a crowd, musical cues, use of certain words (e.g., "hello", "nice to meet you"), and/or the like. In another example, data captured from other sensors such as light meters may be used as features in training the model.

It is noted that convolutional neural networks are only included as one example, and other neural network architectures may be used to implement the deep learning model 122. For example, feed-forward networks, recurrent networks, symmetrically connected networks, long/short term memory networks may be used alone or in combination with each other to meet the needs of a particular application. For example, some architectures may be more efficient or effective at classifying particular types of data or identifying facial features in a structured indoor environment while others are more suitable for outdoor environments with large crowds. Similarly, exemplary training data and training techniques are described herein but implementations may use various training data and training techniques to adapt the specific examples to particular implementations and environments. Other types of machine learning models, such as a Naïve Bayes model, random forest model, logistic regression, decision tree, gradient-boosted tree, multilayer perceptron, and others may also be used as models.

Once trained, the model may be used to determine when to take pictures in real-time, as well as attributes of those pictures such as cameras or angles from which to capture them. For example, images from a real-time video stream from a control camera perspective may be provided as inputs the trained model. In some embodiments, the images are scaled down or the dimensionality of the data otherwise reduced before being provided to the trained model. In most cases the number, format of and data supplied to inputs to the trained model are the same as used during training the model. These inputs include, for example: values representing light intensity captured at each pixel of a plurality of pixels (e.g., 368×368=135,424 input nodes) for each frame of video data and/or features determined based on the video data, such as features indicating body positions, facial expressions, and gaze direction of subjects. In some embodiments, the inputs may include features derived from sources other than video data, such as audio data, light meter readings, and/or the like. In other cases the trained model may use fewer inputs than were used during training in some cases and contexts where it is discovered that certain inputs have little effect on the trained model's outputs. In the particular example, the model has 3 outputs including an output providing the picture indication, an output providing a session begin indication, and an output providing a session end indication. In other embodiments, outputs may include recommended camera settings for image capture cameras, data related to recommended post-processing and storage techniques, and the like. The trained model may process the input images, such as by using a first layer of the model to determine features such as body positions of individuals in the images and a second layer of the model to determine indications based on the features determined by the first layer. Indications may include optimal times at which to take pictures, optimal parameters for taking those pictures, and indications of events such as beginnings and endings of sessions. For example, the model may continuously output indications based on input images from the real-time video stream. In one example, video images are provided at a rate of 15 frames per second, and 15 picture indications are output per second by the model. A given picture indication may include, for example, to take a picture (e.g., using a particular camera with particular parameters), not to take a picture, a beginning of a session, an end of a session, and the like. In certain embodiments, a picture indication output by the model to capture a picture indicates which camera of a plurality of cameras positioned at different locations should be used to capture the picture.

Picture indications output by the model may be evaluated in real-time in order to programmatically perform actions such as capturing pictures based on the indications. For example, a control system may instruct cameras to take pictures in real-time based on the indications, or may instruct a separate camera control system to use the cameras to take pictures. In some embodiments, when an end of a session is indicated by the model, the control system transmits all pictures captured during the session to a presentation system, such as a kiosk, where guests can view the pictures, associate the pictures with identifying information of the guests, purchase the pictures, and the like.

Figure 1:
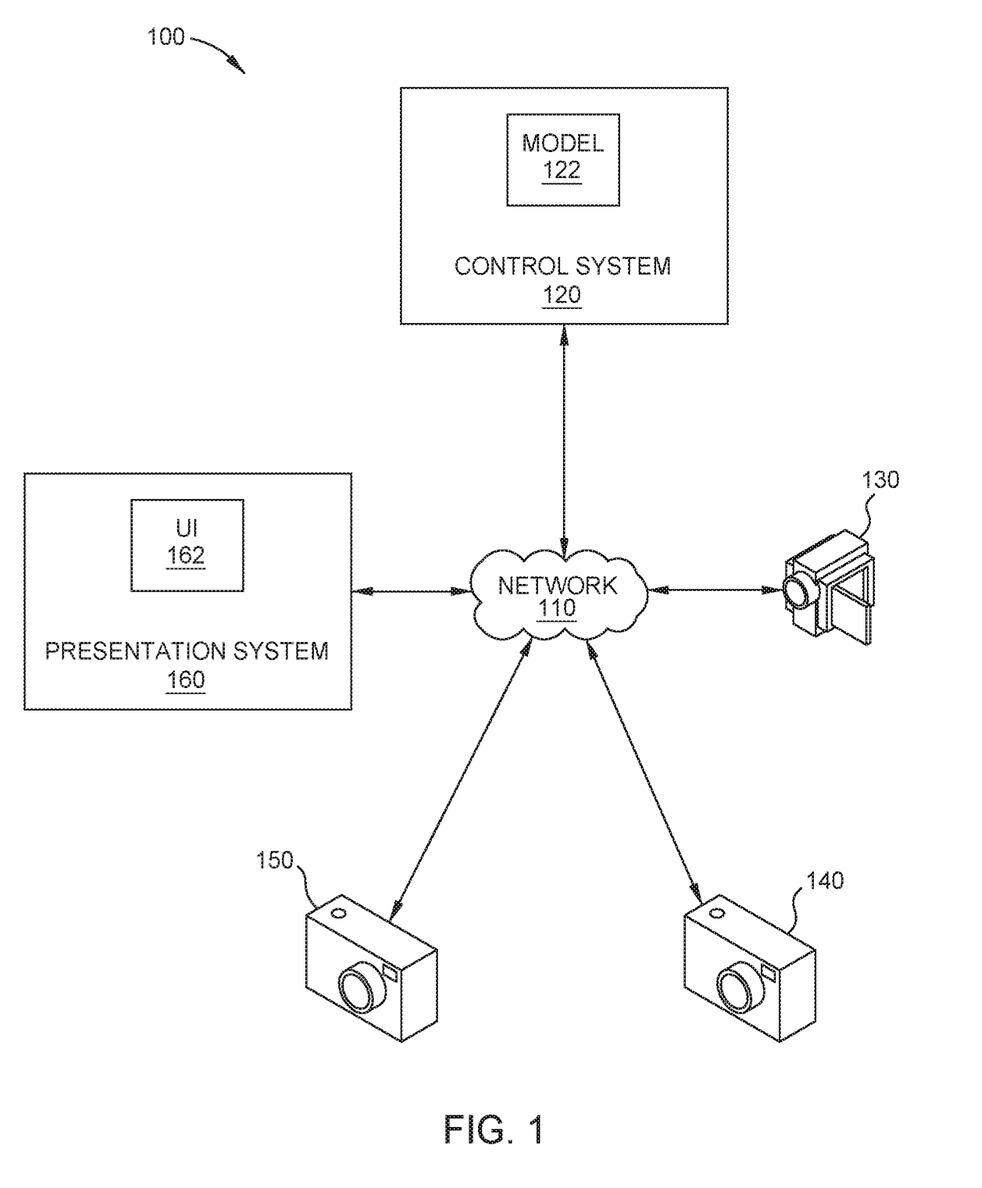
FIG. 1 illustrates an example networking environment in which embodiments of the present disclosure may be implemented.

FIG. 1 illustrates an example networking environment 100 in which embodiments of the present disclosure may be implemented. Networking environment 100 includes a control system 120, a control camera 130, two cameras 140 and 150 (which may in some instances be referred to "image capture cameras"), and a presentation system 160, connected via a network 110. It is noted that, while not depicted, in some embodiments a separate camera control system is included in networking environment 100. Network 110 may represent any type of network over which data may be transmitted, such as a local area network (LAN), wide area network (WAN), peer-to-peer connection, or the like.

Control system 120 may be implemented using any type of computing device, such as a server computer, desktop computer, laptop computer, or the like, and generally performs operations related to intelligent photography using machine learning. Control system 120 includes a model 122, which may be implemented through instructions stored in memory and executed on one or more processors of control system 120.

Control camera 130 generally represents a video camera that is used to capture video data of an environment in which pictures are captured. Although a single control camera is shown in FIG. 1, any number of control cameras may be used to meet the needs of a particular application, although more control cameras will increase the number of inputs to model 122 and corresponding increase in complexity and cost. Control camera 130 may have reduced resolution and color space as compared to image capture cameras 150 to simplify processing. Control camera 130 may detect visible or non-visible (e.g., infra-red) energy, or both. In addition to or instead of control camera 130, some environments may use audio signals detected by control microphones (not shown) and process audio data in a manner similar to the machine learning techniques described herein.

Cameras 140 and 150 generally represent cameras for capturing images in an environment that is monitored by control camera 130. For example, cameras 140 and 150 may be used to programmatically capture pictures of individuals in the environment at optimal times and from optimal angles or positions based on picture indications output by model 122. Cameras 140 do not need to be identical, and may be configured with different lenses, aperture settings, field of view, focus, orientation, and the like so that they each capture a unique perspective of a scene. Cameras 140 and/or 150 may be stationary, or may be mounted on controllable mounts that allow movement to adjust what falls into the camera's field of view.

Presentation system 160 may be implemented by any type of computing device, such as a server computer, desktop computer, laptop computer, or the like, and generally performs operations related to providing pictures to users. For example, pictures captured during a session by cameras 140 and/or 150 may be provided by control system 120 to presentation system 160 when the model outputs an indication that the session has ended. Presentation system 160 includes a user interface (UI) 162, which may display pictures to users. For example, after a session a customer may approach presentation system 160 and view pictures of the session via UI 162. UI 162 may allow customers to purchase and/or store pictures, and pictures may be provided to the customers, such as via email.

Figure 2:
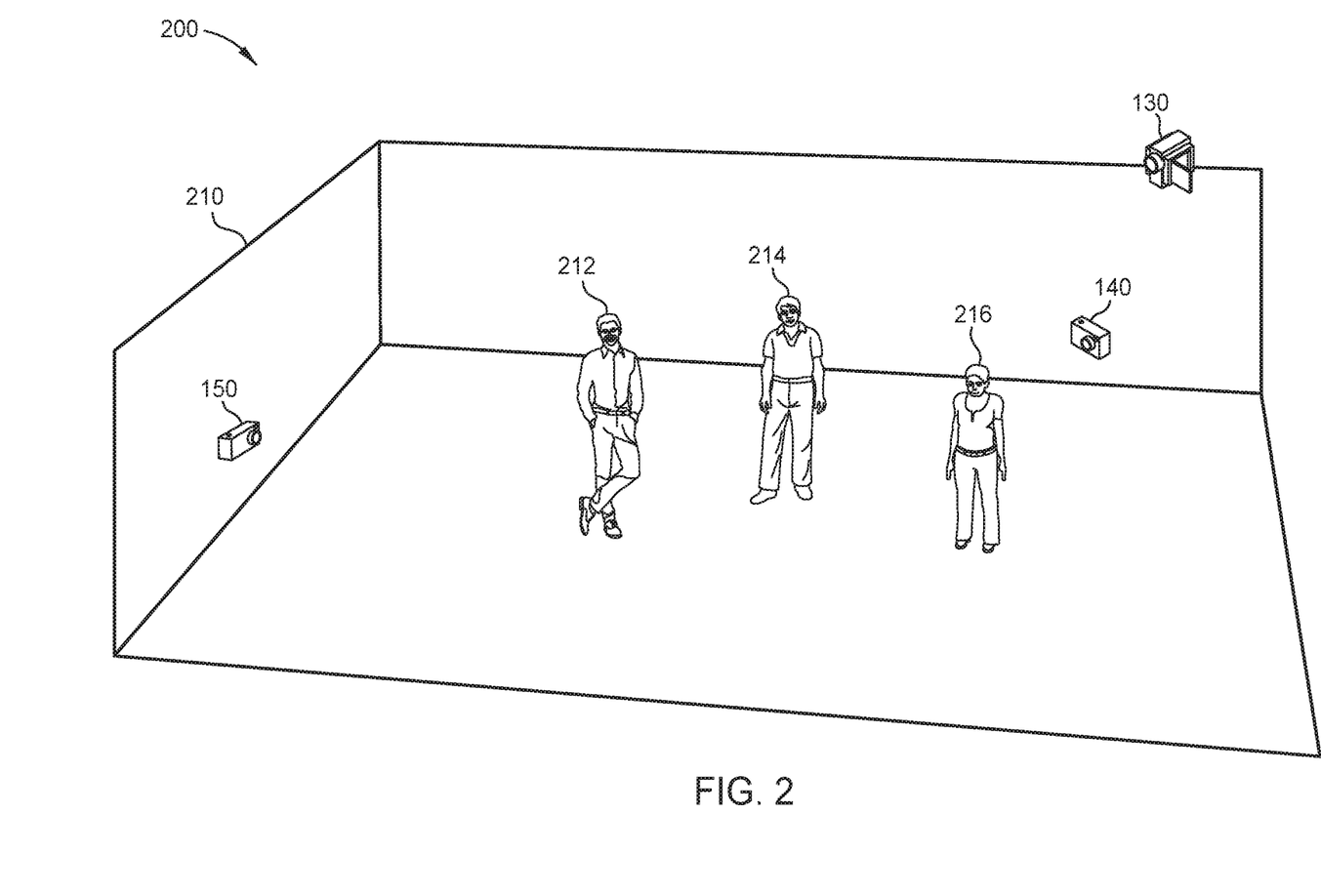
FIG. 2 illustrates an example environment in which embodiments of the present disclosure may be implemented.

FIG. 2 illustrates an example 200 of an environment 210 in which embodiments of the present disclosure may be implemented. Environment 210 may be representative of an environment in which individuals are photographed, such as an area within a theme park where guests interact with characters. Environment 210 includes control camera 130 and cameras 140 and 150 of FIG. 1.

Environment 210 includes subjects 212, 214, and 216, who participate an event or activity that is being photographed. Control camera 130 may capture live video of environment 210, including subjects 212, 214, and 216, and images from the live video may be provided as inputs to a trained model, such as model 122 of FIG. 1, in order to determine picture indications and session indications. For example, if an image from video captured by control camera 130 includes one or more of subjects 212, 214, and 216 entering or exiting environment 210, then the trained model may output an indication that a session is beginning or ending. If an image includes one or more of subjects 212, 214, and 216 assuming a body position similar to body positions of historical guests of which photographers captured pictures (with which the model was trained), the trained model may output a picture indication that a picture should be taken, such as using a particular one of cameras 140 and 150. For example, if one or more of subjects 212, 214, and 216 is below a certain height threshold (e.g., if a child is being photographed), a lower-positioned camera (e.g., camera 140 rather than camera 150) may be selected for programmatically capturing a photo based on an indication from the trained model.

After a session ends, one or more of subjects 212, 214, and 216 may access a presentation system, such as presentation system 160 of FIG. 1 to view the pictures captured during the session, associate the pictures with a unique identifier, and/or purchase the pictures.

Environment 210 may also be representative of an environment in which training data is captured. For example, photographers may control cameras 140 and/or 150 (e.g., directly or through commands to a control system) while control camera 130 captures video data so that data about pictures captured by the photographers (e.g., times at which pictures were taken and cameras from which the pictures were taken) and the video data (e.g., including body positions of subjects 212, 214, and 216) can be used to train the model. Photographers may also record moments at which events occur, such as beginnings and endings of sessions, for use in training the model. For example, positions of certain body parts of subjects 212, 214, and 216, such as arms, legs, and heads, as well postures and positions of subjects 212, 214, and 216 in the frame may be associated with whether or not a picture was taken, which camera a picture was taken from, other attributes of pictures that were taken, when a session began, and/or when a session ended, and these associations may be used in training the model.

Placement and orientation of control camera 130 and cameras 140 and 150 within environment 210 may be determined in advance, such as based on where subjects, such as subjects 212, 214, and 216 are expected to be located when photographed. In certain embodiments, placement of the cameras is selected in order to prevent subjects from seeing the cameras, such as by placing the cameras in locations that are partially or completely obstructed from subjects' view. In certain embodiments, control camera 130 and cameras 140 and 150 are positioned in the same locations while gathering training data and while using the trained model to perform intelligent photography in real-time. While only two cameras 140 and 150 are depicted in environment 210, it is noted that in some embodiments a larger number of cameras may be positioned at different locations throughout environment 210 both when training and when using the model for intelligent photography. As such, indications output by the model to capture pictures using specific cameras may allow for optimal angles or positions to be selected for programmatically capturing pictures in real-time.

While not depicted, techniques described herein may also implemented with a camera operated by a user (e.g., a customer at a theme park or attendee of an event), such as a camera integrated into a user device, such as a mobile phone operated by the user. For example, the user may initiate a process by which a connection is established between the user device and control system 120 of FIG. 1, and control system 120 may send instructions to the user device to capture pictures in real-time based on indications output by the trained model. For instance, the model may have been trained based on pictures captured by user devices connected with control system 120 during historical sessions in association with control video data from the historical sessions, and may output indications of whether or not to capture a picture with a user device based on input images from a live control video stream.

In some instances, a position of the user device (e.g., relative to the control camera that was used to capture data with which the model was trained) may be determined, such as using satellite-based positioning techniques, near-field communication, stereoscopic depth determination, IR or laser-based ranging techniques, or other techniques for identifying a location of a device, or by determining a location of another wearable device (e.g., a smart watch) associated with the user. For example, the model may have been trained based on data about pictures captured by cameras (e.g., user devices, professional cameras, and/or the like) from various locations (e.g., relative to the scene being photographed, relative to the control camera, or the like) during historical sessions, and so may output indications of whether pictures should be taken by user devices at different locations. If, for instance, the model outputs an indication that a picture should be taken by a user device in a given position relative to the control camera, and control system 120 determines that a user device connected to control system 120 is currently in the given position relative to the control camera, then control system 120 may instruct the user device to take the picture. For instance, the functions of control system 120 may alternatively be performed locally on a user device. Furthermore, in alternative embodiments, the control camera may be the same as a camera that is used for image capture.

Figure 3:
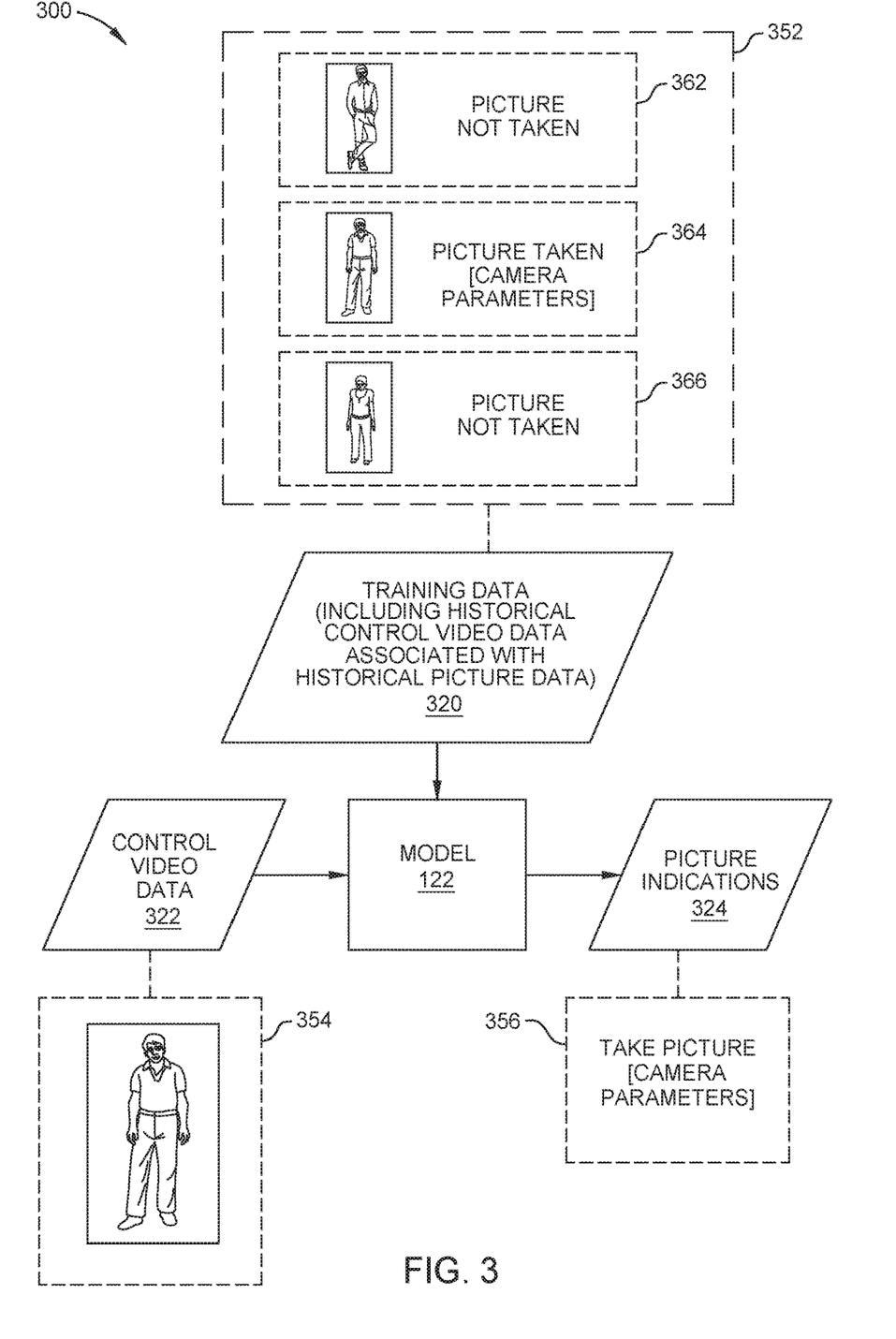
FIG. 3 illustrates an example of training and using a machine learning model as described herein.

FIG. 3 illustrates an example 300 of training and using a machine learning model 122 of FIG. 1.

Model 122 is trained using training data 320, which includes historical control video data associated with historical picture data. As shown in example 352, training data 320 may include a plurality of images (e.g., frames) from video captured using a control camera, such as control camera 130 of FIGS. 1 and 2. Each image in the training data may be associated with historical picture data, such as whether a picture was captured at the time of the image (e.g., by a photographer), which camera or angle was used to capture a picture at the time of an image, whether a session began or ended at the time of the image, and the like. For example, training data 352 includes training data instance 362 including a first image associated with an indication that a picture was not taken, training data instance 364 including a second image associated with an indication that a picture was taken (including camera parameters used to take the picture such as an exposure, focal length, and the like of the image capture camera that was used to capture the picture), and training data instance 366 including a third image associated with an indication that a picture was not taken. In alternative embodiments, training data 352 only includes training data instances in which pictures were taken or only includes training data instances in which pictures were not taken. In practice, because there are likely to be a larger number of instances in which pictures were not taken, it may be more efficient to train the model only using training data instances in which pictures were taken, though other implementations are possible.

Once trained using training data 320, model 122 may be used to generate picture indications 324 based on control video data 322 input into the model in real-time. For example, as shown in example 354, control video data 322 may include an image with features similar to those of the image in training data instance 364. Accordingly, as shown in example 356, model 122 outputs picture indication 324 including an indication to take a picture based on the image in example 354, including camera parameters to use in taking the picture (e.g., which may be the camera parameters from training data instance 264).

Picture indications 324 may be used, such as by control system 120 of FIG. 1, to perform intelligent photography as described herein.

Figure 4:
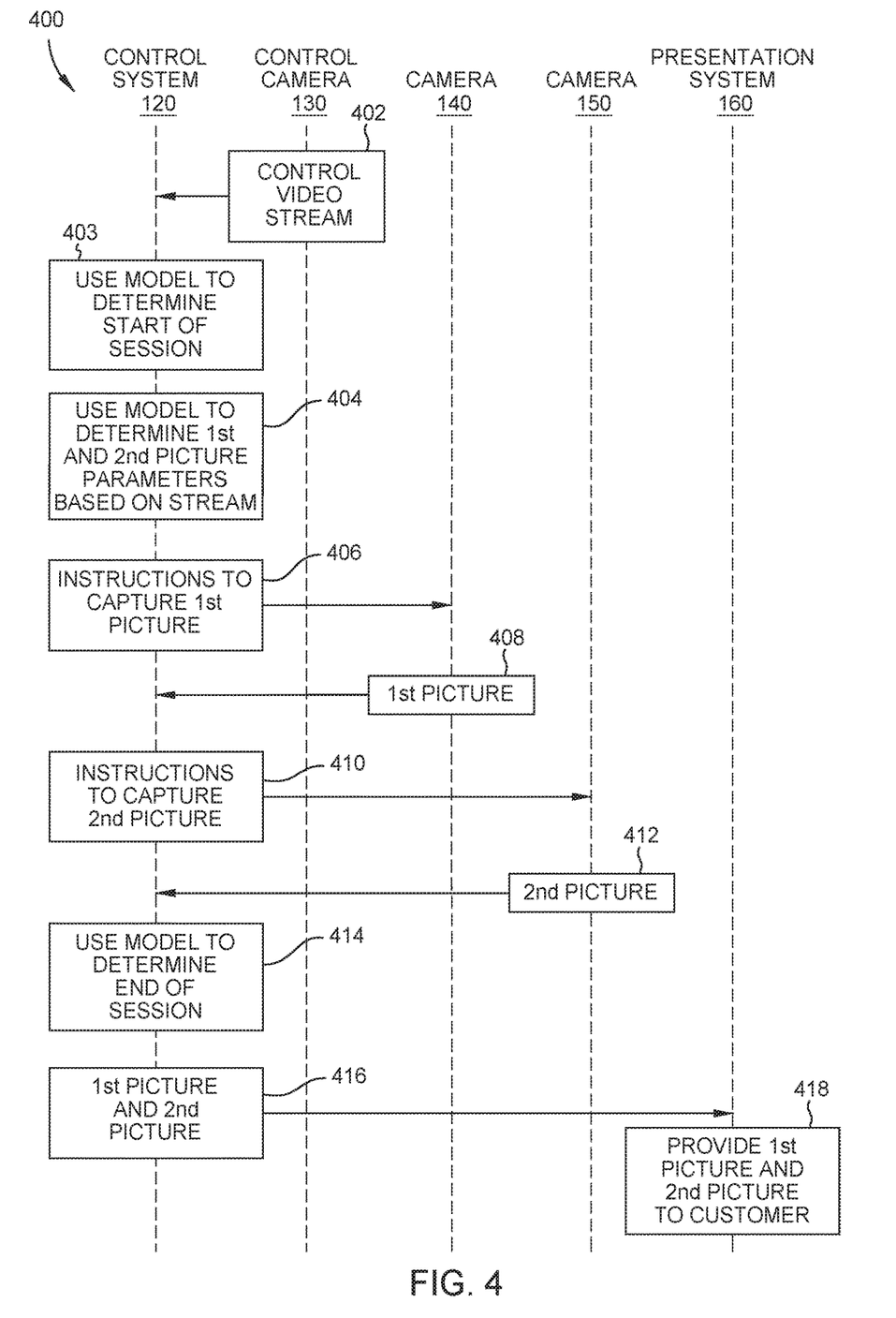
FIG. 4 illustrates an example exchange of messages between components related to intelligent photography with machine learning as described herein.

FIG. 4 is a sequence diagram that illustrates an example 400 of an exchange of messages between components related to intelligent photography with machine learning as described herein. FIG. 4 illustrates operation of an intelligent photography system using a trained model 122 (e.g., after training is completed).

At 402, control camera 130 provides a control video stream to control system 120. For example, the control video stream may be provided in real-time on an ongoing basis, and may include a series of images of an environment in which intelligent photography is being performed.

At 403, control system 120 uses a trained model, such as model 122 of FIGS. 1 and 3, to determine a start of a session. For example, the model may \output an indication that a session has begun based on one or more images of control video stream 402.

At 404, control system 120 uses a trained model, such as model 122 of FIGS. 1 and 3, to determine parameters of a first picture and a second picture (e.g., camera parameters for taking a first picture and a second picture) based on the control video stream received at 402. For instance, control system 120 may provide each image of the control video stream received at 402 in real-time as an input to model 122 of FIGS. 1 and 3, and model 122 may output picture indications for each image. Picture indications for a first given image may indicate that a first picture should be taken from a first camera, such as camera 140, and picture indications for a second given image may indicate that a second picture should be taken from a second camera, such as camera 150. The picture indications may also include camera parameters to be used for capturing each of the first picture and the second picture such as an exposure, focal length, and the like.

In real-time, as indications are output by the model, control system 120 performs programmatic actions based on the indications. At 406, control system 120 provides instructions to capture the first picture to camera 140. The instructions sent at 406 may, in some embodiments, include one or more parameters determined based on outputs from the model, such as an exposure, focal length, and the like. In certain embodiments, the instructions are provided in a format recognized by camera 140, and includes parameters indicating x, y, z values for an angle at which the picture should be taken, exposure, focal length, whether to activate a flash, lighting effects, audio, or the like. At 408, camera 140 captures the first picture (in some embodiments using parameters identified in the instructions) and sends the first picture to control system 120. At 408, control system 120 provides instructions to capture the second picture to camera 150. The instructions sent at 408 may, in some embodiments, include one or more parameters determined based on outputs from the model. The instructions sent at 408 may be similar to those sent at 406. At 410, camera 150 captures the second picture (in some embodiments using parameters identified in the instructions) and sends the second picture to control system 120. It is noted that the first picture and the second picture may be captured at different times based on when the corresponding indications are output by the model.

At 414, control system 120 uses the model to determine an end of a session. For example, the model may have previously output an indication that a session had begun at step 403, and at 414 the model may output an indication that the session has ended (e.g., based on one or more images of control video stream 402). The session start and end indications may be binary signals output by the trained model (e.g., according to training based on historical starts and ends of sessions associated with historical video data). In some embodiments, control system 120 uses the start and end of a session to define a session record or file, associate pictures taken with the session record or file, and associate metadata with the session record or file (e.g., who was in the picture, camera identifier, camera parameters such as exposure, focal length, shutter speed, and the like).

At 416, control system 120 sends the first picture and the second picture to presentation system 160. For example, upon determining that the session has ended at 414, control system 120 may transmit the two pictures captured during the session at 408 and 412 to presentation system 160.

At 418, presentation system 160 provides the first picture and the second picture to one or more customers. For instance, presentation system 160 may display the first picture and second picture to the one or more customers that were captured in the first picture and the second picture, and may provide them with an opportunity to associate the pictures with an identifier and/or to purchase the pictures. If a customer purchases a picture via presentation system 160, the picture may be printed for the customer or provided in another way, such as via email to an email address specified by the customer.

Figure 5:
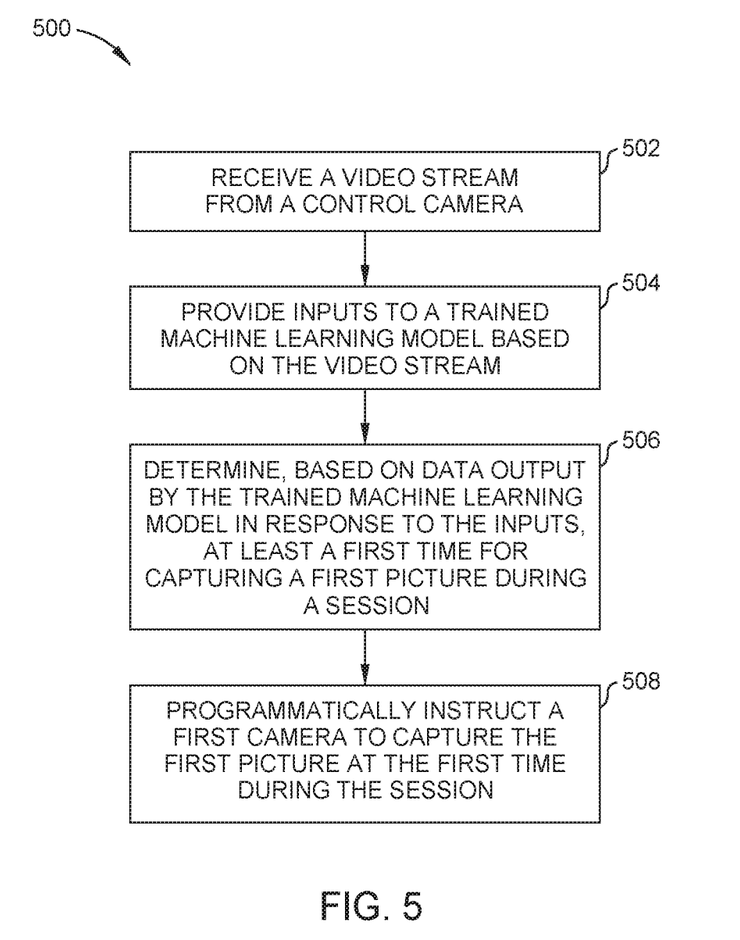
FIG. 5 illustrates example operations related to intelligent photography with machine learning as described herein.

FIG. 5 illustrates example operations 500 related to intelligent photography with machine learning as described herein. For example, operations 500 may be performed by control system 120 of FIG. 1.

At 502, a video stream is received from a control camera. For example, control system 120 of FIG. 1 may receive the video stream in real-time from control camera 130 of FIG. 1.

At 504, inputs are provided to a trained machine learning model based on the video stream. For instance, control system 120 of FIG. 1 may provide images from the video stream as inputs in real-time to model 122 of FIG. 1. The machine learning model may have been trained as described above with respect to FIG. 3.

At 506, at least a first time for capturing a first picture during a session is determined based on data output by the trained machine learning model. For example, control system 120 of FIG. 1 may receive picture indications output by model 122 of FIG. 1, and may determine based on one or more of the picture indications that the first picture should be captured. The session may, for example, correspond to a given customer interacting with a character at a theme park, and the beginning of the session may have determined based on an indication output by the model based on the control video stream.

At 508, a first camera is programmatically instructed to capture the first picture at the first time during the session. For example, control system 120 of FIG. 1 may instruct camera 140 of FIG. 1 to capture the first picture. In some embodiments, additional parameters for capturing the first picture, such as exposure, focal length, and the like, may also be included with the instructions. The first camera may capture the first picture and send it to control system 120 of FIG. 1.

In some embodiments, once it is determined based on data output by the trained model that the session has ended, the first picture may be provided along with any other pictures captured during the session to a presentation system, such as presentation system 160 of FIG. 1. The presentation system 160 may be a display viewable by a user, such as a customer present in the pictures. The user may be enabled to view the pictures, associate the pictures with an identifier of the user, purchase the pictures, and/or the like. For example, the user may a physical token that implements a machine-readable representation of the user's identifier that the user scans using a scanning component associated with the presentation system in order to associate the pictures with an identifier indicated by the physical token. Once associated with an identifier, the pictures may be accessed using the identifier through additional systems, such as other presentation systems at a theme park and/or a website.

Figure 6:
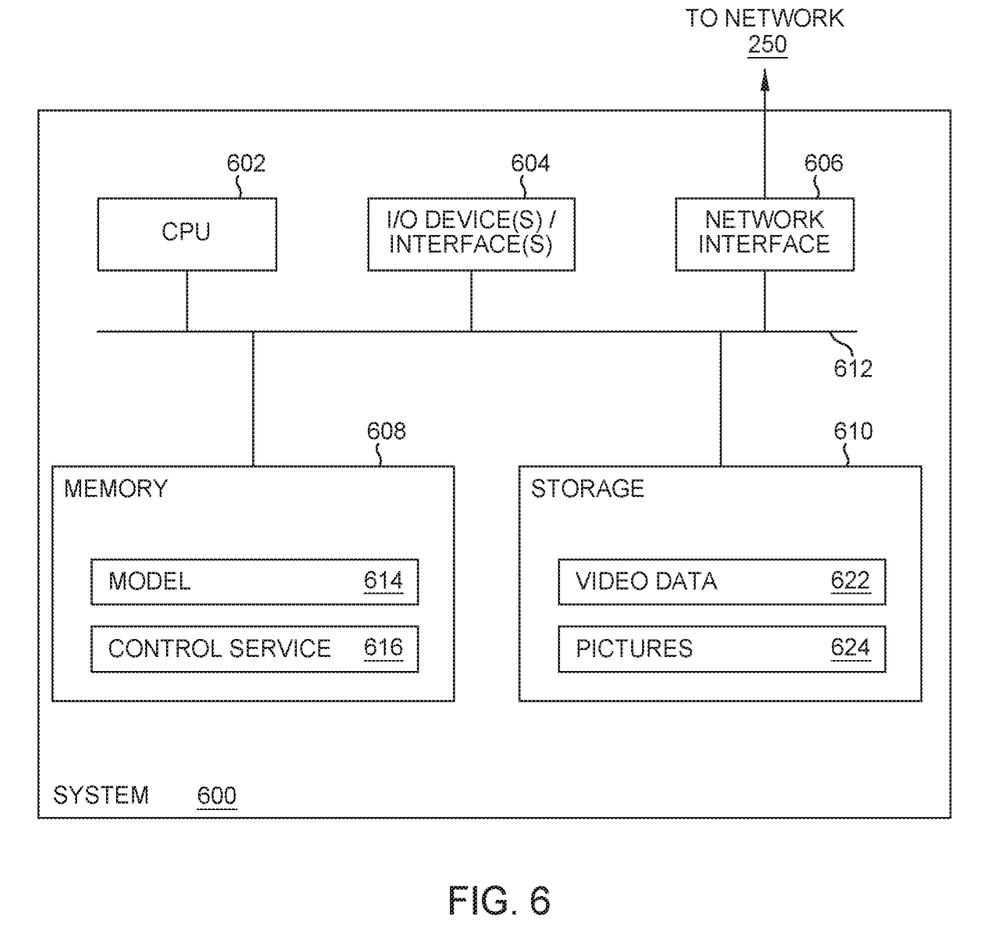
FIG. 6 illustrates an example system with which embodiments of the present disclosure may be implemented.

FIG. 6 depicts a computing system 600 with which embodiments of the present disclosure may be implemented. For example, computing system 600 may represent control system 120 of FIG. 1.

System 600 includes a central processing unit (CPU) 602, one or more I/O device interfaces 604 (that may provide connections for various I/O devices 614, such as keyboards, displays, mouse devices, and the like) to the system 600, network interface 606 (e.g., a physical network interface card), memory 608, storage 610, and an interconnect 612. It is noted that one or more components of system 600 may alternatively be located remotely and accessed via a network, such as network 110 of FIG. 1. It is further contemplated that one or more components of system 600 may comprise physical or virtualized components.

CPU 602 may receive and execute instructions stored in memory 608. Similarly, the CPU 602 may receive and store data related to applications in memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements. Additionally, the memory 608 may represent a random access memory.

As shown, memory 608 includes model 614, which is representative of model 122 of FIG. 1. Memory 608 further includes control service 616, which may perform one or more operations described herein related to intelligent photography with machine learning, such as operations 500 of FIG. 5.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises video data 622, which may be representative of video data received from a control camera, such as control camera 130 of FIG. 1, and may be used to provide inputs to model 614. Storage 610 further comprises pictures 624, which may comprise pictures captured according to intelligent photography techniques described herein, such as received from cameras 140 and/or 150 of FIG. 1.

The present disclosure is not limited to specific described embodiments. Instead, any combination of the features and elements described, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s).

Embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects. Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method performed by a first computing device, comprising:
   receiving a video stream from a control camera;
   providing inputs to a trained machine learning model based on the video stream;
   determining, based on data output by the trained machine learning model in response to the inputs, at least a first time for capturing a first picture during a session;
   identifying, based on the data output by the trained machine learning model in response to the inputs, a first camera from a plurality of cameras for capturing the first picture; and
   programmatically instructing the first camera to capture the first picture at the first time during the session.

2. The method of claim 1, wherein receiving the video stream from the control camera comprises receiving a plurality of images in real-time comprising one or more subjects.

3. The method of claim 1, wherein the trained machine learning model has been trained based on data related to historical picture data from historical sessions along with historical video data of the historical sessions.

4. The method of claim 1, further comprising determining, based on the data output by the trained machine learning model in response to the inputs, a parameter for taking the first picture.

5. The method of claim 1, wherein the trained machine learning model comprises a multilayer convolutional neural network (CNN).

6. The method of claim 1, further comprising determining, based on the data output by the trained machine learning model in response to the inputs:
   a beginning of the session; and
   an end of the session.

7. The method of claim 6, further comprising, after the end of the session, transmitting the first picture to a second computing device.

8. A non-transitory computer-readable medium comprising instructions that, when executed by one or more processors, cause the one or more processors to perform a method, the method comprising:
   receiving a video stream from a control camera;
   providing inputs to a trained machine learning model based on the video stream;
   determining, based on data output by the trained machine learning model in response to the inputs, at least a first time for capturing a first picture during a session;
   identifying, based on the data output by the trained machine learning model in response to the inputs, a first camera from a plurality of cameras for capturing the first picture; and
   programmatically instructing the first camera to capture the first picture at the first time during the session.

9. The non-transitory computer-readable medium of claim 8, wherein receiving the video stream from the control camera comprises receiving a plurality of images in real-time comprising one or more subjects.

10. The non-transitory computer-readable medium of claim 8, wherein the trained machine learning model has been trained based on data related to historical picture data from historical sessions along with historical video data of the historical sessions.

11. The non-transitory computer-readable medium of claim 8, wherein the method further comprises determining, based on the data output by the trained machine learning model in response to the inputs, a parameter for taking the first picture.

12. The non-transitory computer-readable medium of claim 8, wherein the trained machine learning model comprises a multilayer convolutional neural network (CNN).

13. The non-transitory computer-readable medium of claim 8, wherein the inputs to the trained machine learning model are based on one or more of:
- a body position of a subject present in the video stream;
- a facial expression of the subject present in the video stream; or
- a gaze direction of the subject present in the video stream.

14. The non-transitory computer-readable medium of claim 8, wherein the method further comprises, based on the data output by the trained machine learning model in response to the inputs:
- a beginning of the session; and
- an end of the session.

15. The non-transitory computer-readable medium of claim 14, wherein the method further comprises, after the end of the session, transmitting the first picture to a second computing device.

16. A system, comprising:
- one or more processors; and
- a non-transitory computer-readable medium comprising instructions that, when executed by the one or more processors, cause the one or more processors to perform a method, the method comprising:
  - receiving a video stream from a control camera;
  - providing inputs to a trained machine learning model based on the video stream;
  - determining, based on data output by the trained machine learning model in response to the inputs, at least a first time for capturing a first picture during a session;
  - identifying, based on the data output by the trained machine learning model in response to the inputs, a first camera from a plurality of cameras for capturing the first picture; and
  - programmatically instructing the first camera to capture the first picture at the first time during the session.

17. The system of claim 16, wherein the inputs to the trained machine learning model are based on one or more of:
- a body position of a subject present in the video stream;
- a facial expression of the subject present in the video stream; or
- a gaze direction of the subject present in the video stream.

18. The system of claim 16, wherein the method further comprises determining, based on the data output by the trained machine learning model in response to the inputs:
- a beginning of the session; and
- an end of the session.

19. The system of claim 18, wherein the method further comprises, after the end of the session, transmitting the first picture to a second computing device.

20. A method performed by a first computing device, comprising:
- receiving a video stream from a control camera;
- providing inputs to a trained machine learning model based on the video stream, wherein the inputs to the trained machine learning model are based on one or more of:
  - a body position of a subject present in the video stream;
  - a facial expression of the subject present in the video stream; or
  - a gaze direction of the subject present in the video stream;
- determining, based on data output by the trained machine learning model in response to the inputs, at least a first time for capturing a first picture during a session; and
- programmatically instructing a first camera to capture the first picture at the first time during the session.

* * * * *